Aug. 8, 1933.        C. W. BAILEY         1,921,379
OIL PAN ASSEMBLING MEANS
Filed May 22, 1930
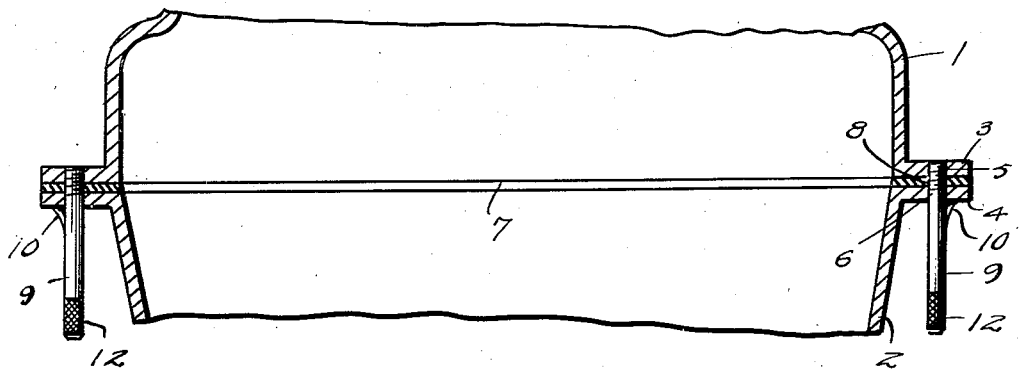
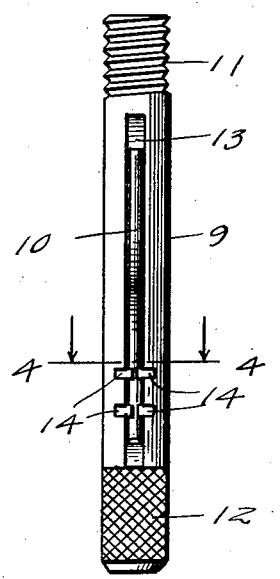  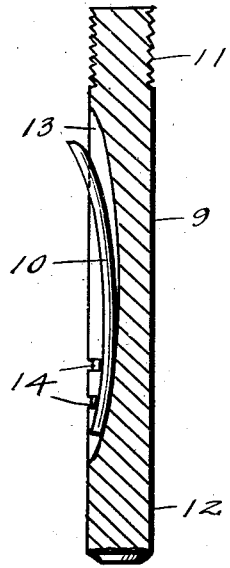
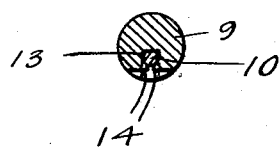
Inventor
C. W. Bailey
By Watson E. Coleman
Attorney Patented Aug. 8, 1933

1,921,379

UNITED STATES PATENT OFFICE 1,921,379

OIL PAN ASSEMBLING MEANS

Charles W. Bailey, Kansas City, Mo., assignor to Paul A. Froeschl and Otto P. Froeschl, Kansas City, Mo.

Application May 22, 1930. Serial No. 454,808

3 Claims. (Cl. 29—84)

When overhauling internal combustion motors of that type having oil pans removably secured to the bottoms of their cylinder blocks, it is usually necessary to remove such pans. While an oil pan of this character may be easily removed, the replacing thereof is a difficult and time consuming operation. This is due to the fact that the pan and its gasket must be supported against the bottom of the cylinder block with their openings in registration with the openings in the bottom of the cylinder block in order to permit the application of the pan attaching bolts or cap screws. If the pan is being replaced by two mechanics, one supports the pan and the other applies the bolts or cap screws, while if the pan is being replaced by one mechanic, he must support the pan in place by one hand so as to permit the other hand to be used for the purpose of applying the bolts or cap screws.

The invention has for one of its objects to provide novel means through the medium of which an oil pan of the character stated may be replaced by one mechanic without difficulty and in a comparatively short time.

To attain this and other objects, the nature of which will appear as the description proceeds, the invention comprehends the provision of means through the medium of which the pan and its gasket may be supported, without manual effort, in proper place, to the end that both hands of the mechanic may be employed in the application of the bolts or cap screws and that he may assume a position best calculated to permit the ready application of the bolts or cap screws.

The invention is hereinafter fully described and claimed, and illustrated in the accompanying drawing, wherein:

Figure 1 is a sectional view illustrating the application of the oil pan supporting means;

Figure 2 is a view in side elevation on an enlarged scale of one of the elements of the oil pan supporting means;

Figure 3 is a sectional view taken on the plane extending centrally and longitudinally through the element of the oil pan supporting means, and Figure 4 is a transverse sectional view taken on the plane indicated by the line 4—4 of Figure 2.

Referring in detail to the drawing, 1 designates a fragmentary portion of the bottom of a cylinder block of an internal combustion motor, and 2 designates the oil pan of the motor. These parts, which are of well known construction and are shown in transverse section, are provided with outwardly directed flanges or ledges 3 and 4, respectively. The oil pan 2 is secured in place by cap screws or bolts, not shown, which pass through openings 5 in the ledge 3 and openings 6 in the ledge 4. The openings 5 have their walls screw threaded to permit the cap screws or bolts to be engaged with the ledge 3, and the walls of the openings 6 are smooth to permit the free passage of the cap screws or bolts therethrough. The connection between the oil pan 2 and the bottom 1 of the cylinder block is sealed by a gasket 7 which is arranged between the ledges 3 and 4 and is provided with openings 8 alining with the openings in the ledges.

The means for supporting the oil pan 2 and the gasket 7 in place with the openings of the gasket and ledges 3 and 4 in registration, to the end that the cap screws or bolts may be readily applied, comprises studs 9, and springs 10 carried by the studs. The studs 9 are provided with screw threaded upper end portions 11 and knurled lower end portions 12. The intermediate or body portions of the studs 9 are smooth and are provided with longitudinally extending grooves 13 for the reception of the springs 10. The springs 10 are in the form of rods, and are of arcuate formation in the direction of their length. The lower end portions of the springs 10 are secured in the grooves 13 by lugs 14 which are punched up from the studs 9 and clamp said end portions of the springs between themselves and the bottom walls of the grooves. The springs 10 curve upwardly and outwardly from their anchored lower end portions, and their upper end portions extend outwardly or laterally beyond the studs 9 and are located below the screw threaded upper end portions 11 of the studs.

In practice, the studs 9 are secured to the ledge 3 by having their screw threaded upper end portions 11 preferably engaged with the walls of those of the openings 5 that are located at the transverse center of the cylinder block bottom 1. The studs 9 may be readily connected to the ledge 3 through the medium of their knurled lower end portions 12, and when in applied position, they extend downwardly from the ledge with the upper ends of the springs 10 spaced from the lower side of the ledge for a distance equal to or slightly greater than the combined thickness of the ledge 4 and gasket 7.

The oil pan 2 and the gasket 7 are applied to the studs 9 in a manner to have the studs received by those openings thereof that correspond to the openings 5 with which the studs are engaged. The pan 2 and gasket 7 are moved upwardly on the studs 9 until the pan ledge 4 is in a position above the upper free ends of the springs 10. During the upward movement of the oil pan 2, the upper free ends of the springs 10 will move into the slots 13, and when the ledge 4 is above such ends of the springs, the latter will move outwardly and contact with the lower side of the ledge with the result that the pan will be supported in applied position. With the oil pan thus supported in applied position, the openings in the ledges 3 and 4 and in the gasket 7 will be in full registration, and the mechanic may easily and quickly apply the cap screws for securing the pan in place. After all but two of the cap screws have been applied, the studs 9 are removed and thereafter the remaining cap screws are applied. The studs 9 are of uniform diameter from their screw-threaded portions 11 to their lower ends so as to permit the oil pan 2 to be readily applied to the studs after the latter have been secured to the cylinder block ledges 3.

It should be understood from the foregoing description, taken in connection with the accompanying drawing, that the oil pan supporting means is simple and capable of being manufactured at low cost, that the elements thereof may be readily applied to and removed from the pan supporting ledge of a cylinder block, and that it materially reduces the time and labor necessary to replace the oil pan and the oil pan gasket of an internal combustion motor.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. In combination with a member having horizontal flanges provided with threaded apertures and a detachable member having a plurality of apertures registering with the threaded apertures; an alining and supporting means engageable in the threaded apertures for alining and supporting the detachable member against the horizontal flanges, said means comprising a round bar having threads at one end to engage in the threaded apertures, said bar having an elongated groove therein, and a resilient supporting member mounted within the groove and having a portion thereof normally disposed beyond the periphery of the bar and positioned in inwardly spaced relation to the threads.

2. An aligning and supporting means for a detachable member having horizontal apertured flanges, said detachable member being engageable with a member having horizontal flanges provided with threaded apertures comprising a round bar having threads at one end to engage in said threaded openings, said bar having an elongated groove therein, and a resilient supporting member mounted within the groove and having a portion thereof normally disposed beyond the periphery of the bar and positioned in inwardly spaced relation to the threads, said detachable member being adapted to be slipped over the bar for engagement with the horizontal flanges and to be supported above said portion of the supporting member extending beyond the periphery of the bar.

3. A fastener for temporarily securing an object in place upon its support while its permanent fasteners are being applied, consisting of a stud shank threaded on one end and adapted to be removably secured to said support by said threaded end leaving its body extending outwardly from said support to form a hand piece, said object being adapted to be secured over said outwardly extending body with said hand piece extending below said object, and an engaging spring secured to said shank having a shoulder between the threaded end and hand piece adapted to temporarily engage and support the object on the shank, the body of said shank being formed with an opening into which said shoulder portion of said spring is adapted to recede and permit said object engaging said shank below said shoulder, said shank being removable from said support without depressing said spring.

CHARLES W. BAILEY.